April 14, 1970     D. SILVERMAN     3,506,011

MEDICAL INSTRUMENT FOR EVERTING A THINWALLED FLEXIBLE TUBING

Filed July 15, 1966     3 Sheets-Sheet 1

*Daniel Silverman* INVENTOR.

April 14, 1970     D. SILVERMAN     3,506,011
MEDICAL INSTRUMENT FOR EVERTING A THINWALLED FLEXIBLE TUBING
Filed July 15, 1966     3 Sheets-Sheet 2

*Daniel Silverman*
INVENTOR.

April 14, 1970          D. SILVERMAN          3,506,011
MEDICAL INSTRUMENT FOR EVERTING A THINWALLED FLEXIBLE TUBING
Filed July 15, 1966          3 Sheets-Sheet 3

Daniel Silverman
INVENTOR.

United States Patent Office 3,506,011
Patented Apr. 14, 1970

3,506,011
MEDICAL INSTRUMENT FOR EVERTING A THINWALLED FLEXIBLE TUBING
Daniel Silverman, 5969 S. Birmingham,
Tulsa, Okla. 74105
Filed July 15, 1966, Ser. No. 565,556
Int. Cl. A61m *25/00, 29/00;* B29c *19/00*
U.S. Cl. 128—348             28 Claims

---

ABSTRACT OF THE DISCLOSURE

This invention covers a simple disposable apparatus for everting a thinwalled flexible tubing. It involves a length of collapsed thinwalled tubing which is to be everted, a first end is turned back on itself to form a cuff, providing an annular volume between the cuff and the collapsed tubing. Means to seal the cuff to the tubing are provided to close off the annular volume, and means are provided to insert fluid under pressure into the closed-off volume. This pressure causes the volume to expand longitudinally, drawing the collapsed tubing through the seal and causing it to be everted. The cuff is sealed to the tubing by being pressed into sliding sealing contact, or means such as a sealing ring is placed in the annulus. A disc with a central opening can be used with the tubing inserted through the opening, turned back on itself and sealed circumferentially to the disc.

---

This invention has to do with medical instruments. More particularly, it is concerned with medical instruments in which a thinwalled flexible tubing or probe is everted by fluid pressure into a body cavity. This everting tubing can be used to contact and treat the walls of the cavity, or it can be used to draw into the cavity, capsules of medication, volumes of liquids or gels, medical instruments, etc., that can be placed inside the tubing at one or more spaced positions, or can be tied to an end of said tubing. Or it can also be used to draw into the cavity a long small bore thickwalled flexible tube which can be used as a catheter to drain fluid from the cavity, etc. Also, it can be used to draw into the cavity, medical instruments of any desired type.

In my patent U.S. No. 168,092 issued Feb. 2, 1956, and in my copending patention applications S.N. 498,256 filed Oct. 20, 1965, now Patent No. 3,433,214 issued Mar. 18, 1969, entitled Method and Apparatus for Everting Under Pressure a Tubular Probe Into a Body cavity; S.N. 498,462 filed Oct. 20, 1965, now Patent No. 3,433,215 issued Mar. 18, 1969, entitled Method and Apparatus for Placing in and Retrieving a Tubular Probe From a Body Cavity; S.N. 498,653 filed Oct. 20, 1965, entitled Method of and Apparatus for Placing in and Retrieving a Tubular Probe from a body cavity; S.N. 499,292 filed Oct. 21, 1965, entitled Medical Probe and Method Including Flexible Extrudable Tubing Adapted to be Extraverted and Everted Under Pressure; and S.N. 504,815 field Oct. 24, 1965, entitled Medical Probe Adapated to be Everted Under Pressure and Method; I show embodiments of apparatus for the purposes outlined above. These generally comprise a housing of substantial size, having an open end across which the tubing is sealed, a closed end with a resilient pressure seal, and means to introduce fluid into the housing. The pressure of the fluid forces the tubing out of the open end, everting it and driving it into a cavity, at the mouth of which the open end of the housing is placed. The everting tubing can be driven into a closed conduit or cavity, or a partially open tortuous cramped space to contact and exert pressure on the walls thereof, etc.

This invention goes in the direction of simplifying the instrumentation and placing it in the category of a completely disposable, expendable device. This is done by eliminating almost all of the casing or housing, except the back end. In general, this invention comprises a ring or disc with a central opening. The inner circumference includes means to seal the collapsed tubing. The outer circumference of the ring is adapted to seal the end of the tubing. In other words, the apparatus now becomes a ring or disc having an opening through the wall of the disc, the opening adapted by resilient construction to seal the collapsed tubing as the free end of the tubing is passed through the opening from the back surface to the front surface. The free end of the tubing (now in front of the disc) is turned back on itself to form a cuff, which is sealed circumferentially to the disc. This forms an annular volume contained between the turned-back cuff and the disc. Fluid can be introduced into this volume, either by conduit or needle, through the wall of the disc from the back to the front, or through the annular space in the central opening between the collapsed tubing and the resilient sealing member. This fluid pressure will cause the annular volume to expand, drawing tubing through the central opening to the front of the disc, everting it and extending it to the front (into a body cavity, for example). The tubing that remains in the sealed opening after the everted tubing has progressed as far as desired, can then be used to retrieve the tubing by inverting it and withdrawing it through the sealed opening.

This apparatus is so simple and cheap that it can be considered to be expendable. It is thus an object of this invention to provide a convenient, a simple, cheap, disposable instrument for everting a thinwalled flexible tubing that can be inserted, everted, and projected into a tortuous elongated body cavity.

Other objects and a complete understanding of this invention will be ascertained as the various embodiments illustrated in the attached drawings will be described at length.

In the drawings:

FIGURES 1, 2, 3, and 4 show various embodiments of the everting instrument of this invention.

FIGURES 5, 5(a), and 5(b) show embodiments adapted for use as catheters.

Figure 1:
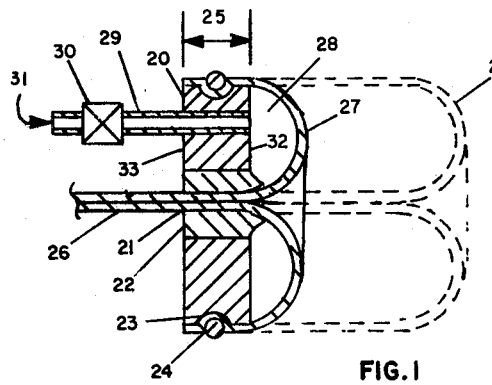

FIGURE 1 illustrates one embodiment of this invention. It consists of a ring or disc 20 with a transverse opening 21 through the wall 25. The disc can be of any shape (although a circular shape is to be preferred) and any thickness, so long as there is ample space for sealing on the internal contact of the ring with the tubing 26, and on the circumference. The material of ring or disc 20 can be substantially rigid with a resilient tube 22 on the inside of the opening 21, or the entire disc can be resilient. The opening 21 can be in any position, although a central opening is to be preferred. Means are provided, such as by tube 29, passing through the wall of the disc and valve 30, to force and lock gas or liquid into the space 28, formed by the tubing 27 passing through the central or seal opening 21, the sealed end of the tubing 27, sealed around the circumference of the disc by means such as ring clip 24, and the wall 32 of the disc 20. As fluid is introduced through tube 29, this volume 28 increases, and this draws tubing through the seal opening from wall 33 to wall 32 of the disc. The tubing 27 is everted and projected forward to position 27', for example.

The seal at 22 is very important, and the resilient material must be such character and be designed of such shape as to tightly seal against fluid leakage around the tubing 26 as it passes through the seal opening.

Figure 2:
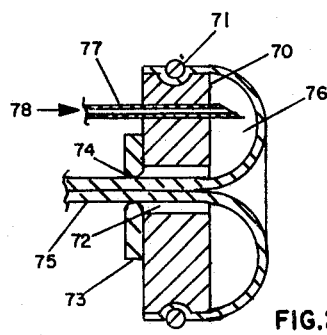

In FIGURE 2, I show another type of seal which is a perforated sheet 73 of elastomeric material with opening 74 that can be stretched over the end of the tubing 75 and which will cling tightly and seal to the collapsed tubing. Also, in FIGURE 2, I show that the means for introducing fluid into the space 76 can be a small bore needle 77 inserted through the wall of the disc 70. If the material of the disc is sufficiently resilient the needle can be inserted into the space 76 and fluid introduced to evert the tubing to the desired point. Then the needle can be removed and the fluid sealed in the space 76.

Figure 3:
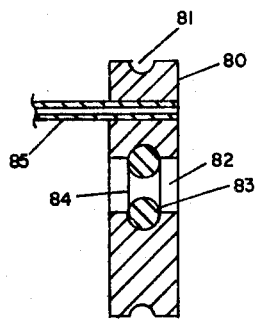

In FIGURE 3, I show another embodiment in which the seal is accomplished by an O-ring of resilient material 83, inserted into a circumferential notch or groove in the inside opening 82 of the central opening of the disc. The tubing in collapsed form is sealed in the opening 84.

Figure 4:
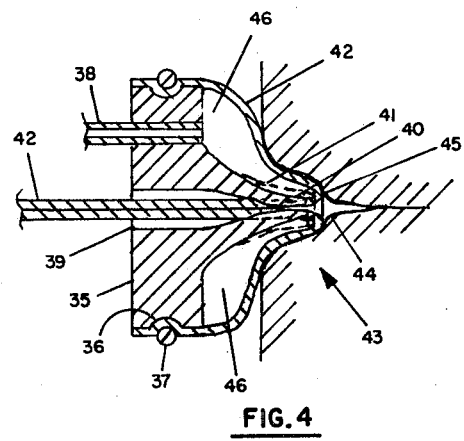

In FIGURE 4, I show another embodiment in which the resilient seal member comprises a tubular extension 40 along the axis of the central opening 39. This extension is of nominal diameter less than the diameter of the collapsed tubing which is to be sealed, but it can be expanded 41 (shown dotted) to larger diameter to accommodate the tubing and will confine itself tightly about the tubing. In this embodiment, the fluid pressure on the outside of the extension 40 will cause it to press more tightly about the tubing and provide a tight pressure seal. The turned-back tubing can be sealed to the ring 35 by means of the circumferential ring 37, by other fasteners, or it can be cemented to or molded as part of the ring 35, and so on.

There is another advantage of this embodiment of FIGURE 4 in that the device has a small diameter nosepiece, which is adapted to be inserted into the mouth 43 of a body cavity having walls 44, 45, etc. Once inserted, as the pressure in space 46 increases, the tubing will be everted from the opening in extension 40 into the cavity.

Figure 5:
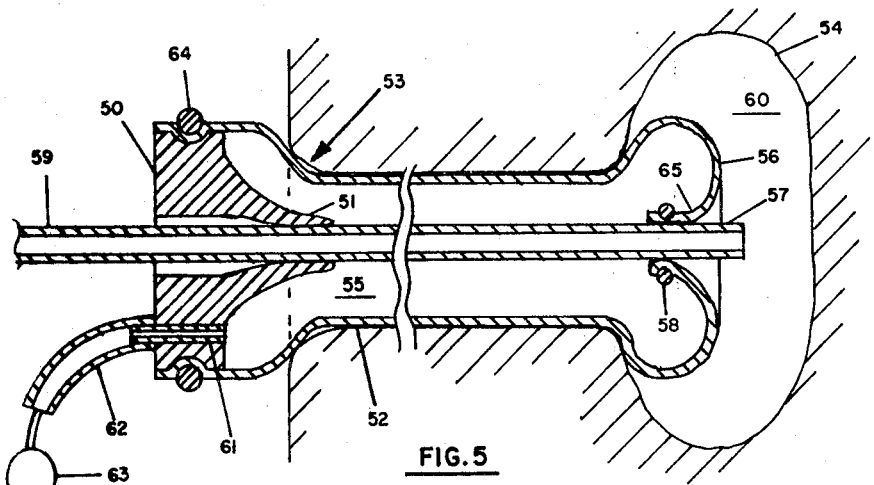

In FIGURE 5, I show an extension of the embodiment of FIGURE 4. This involves using a predetermined length of tubing 56, passing the free end through the seal extension 51 and sealing the turned back end circumferentially at 64. The other end of the tubing 65 is sealed by means such as 58 to a small bore thickwalled flexible tube 57, which is of a length greater than that of the tubing 56. The fastening 58 must be such as to pass through the seal extension 51.

Figure 5A:
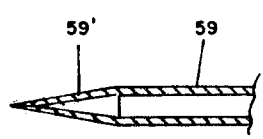
Figure 5B:
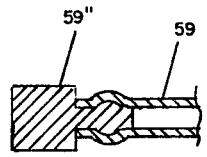

The operation of the embodiment of FIGURE 5 is as follows: The tubing 56 is inserted through 51 and turned back and sealed at 64. The nose 51 is inserted into the mouth 53 of the conduit or cavity 52. This conduit reaches from the mouth 53 to a larger cavity or bladder 54 enclosing space 60. By forcing fluid through conduit 61 by means such as tube 62 and pump 63, the tubing 56 is everted from seal opening 51 into the conduit 52 to the space 60. As the end 65 moves through the conduit 52 it draws with it the tube 57 which is now sealed at 51. The open end 57 of the tube is exposed to the space 60 and will carry any fluid in 60 out through conduit 52 through the ring 50 to the outer end 59 of the tube. The ring 50, tubing 56, and tube 57 comprise a catheter type instrument that can be inserted into a channel or conduit without friction or abrasion. If desired, the end 59 of the tube can be kept open, or it can be fashioned in the form of a check valve (shown schematically), permitting fluid to flow from the cavity 60 through 57 to 59', FIG. 5(a) but not in the reverse direction. Also, as shown schematically as 59'' FIG. 5(b), the tube 59 can be closed off by means of a stopper, or it can have a valve connected, as is well known in the art. Also, if it is desired to close off the passage 52, the tube 57 can be a rod. Thus, the tubing 56 and the tubing with stopper or valve form a removable closure for the conduit 52. In contradistinction to a catheter which is adapted to be placed in a body conduit to keep it open, this device with a valve or stopper, can be used to close a body conduit. Of course, the valve, check valve or stopper can be adapted for use with other designs of catheters. The bulging portion 56 of the tubing, so long as fluid pressure remains in 55, will lock the catheter into the bladder 54. After use, the tubing 56 can be deflated and the entire assembly withdrawn from the conduit 52, or the fluid pressure can be maintained in 55 at a suitable value and the tube 57 can be withdrawn, inverting and retrieving the tubing 56.

After use the entire instrument 50, 56, and 57 would probably be disposed of as expendable. The pump 63 and possibly tube 62 might be saved and reused.

Figure 6:
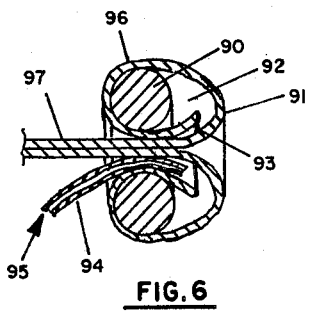
FIGURES 6 and 7 show two other embodiments, in which very simple apparatus is required.
Figure 7:
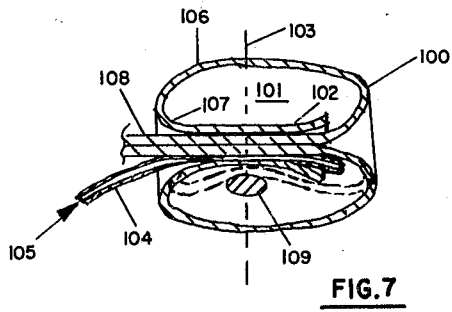

In FIGURES 6 and 7, I show two additional embodiments of this invention. In FIGURE 7, I show how the end of the tubing 100 is turned back on itself, 106 and then tucked in, 107 in the annular space surrounding the collapsed tubing 108, the end 102 being placed sufficiently forward so that a substantial length of contact is provided to seal the volume 101. Fluid is forced into this volume 101 by means such as the small diameter tube 104. If desired, some constrictive means such as ring 109 of elastomeric material (shown only in the lower half of the figure in dotted outline) can be used in the plane 103 to confine the loops 106, 107, 102 and 108 of the tubing to effectuate an optimum seal in the plane 103. Now as fluid pressure is built up in 101, the tubing 108 will be drawn forward and everted.

Figure 8:
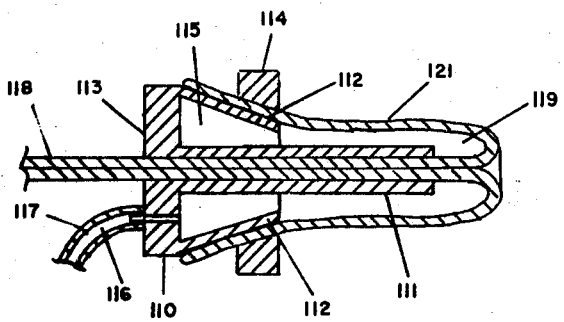
FIGURE 8 shows another embodiment having particular advantages.

In FIGURE 6, a similar embodiment is shown except that a toroid of elastomeric material 90 is used to assist in the formation of the loop 96–93 of tubing. The free end of the tubing 93 is first inserted through the center opening of the toroid 90. It is turned back over the exterior of the toroid. Then the tubing end 93 and toroid are rolled along the tubing 97 until the end 93 feeds back through the center of the toroid a second time. The toroid now helps to seal the end 93 against the tubing 97. As in FIGURE 7, fluid is introduced into the volume 92 by means such as the tube 94. However, an annular device such as illustrated in FIGURE 8 can be used. If desired, a circumferential constrictive member (not shown) can be placed around the outside of the toroid to clamp the outer layer of tubing 96 against the toroid and squeeze it inward against the turn 93 and against the tubing 97, to effectuate an optimum fluid seal. As before, forcing fluid into annular volume 92 will cause the tubing 97 to be drawn into the seal area and out to the front to be everted.

In FIGURE 8, I show another form of the invention. It is similar in some respects to FIGURE 4, where the interior tube 111 corresponds to 40 of FIGURE 4. The second, outer tube 112 permits a number of advantages. The tubing 118 is introduced through the central opening and is sealed by tube 111. It is turned back over the conical tube 112. There it can be sealed on the outer circumference by means such as the circumferential ring 114. By pressing the ring 114 farther along the taper, the seal between the tubing 121 and tube 112 is improved. Also, by pushing the ring still farther, the tubes 111, 112 are compressed tightly together, sealing the annular volume 119, and tube 111 tightly about the tubing 118.

Figure 9:
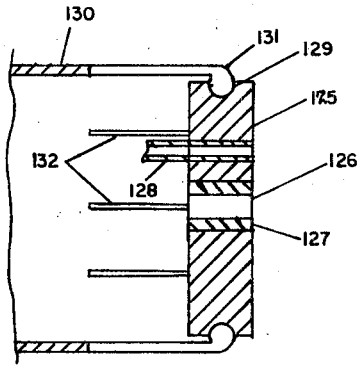
FIGURE 9 illustrates a type of handle that might be used with this instrument.

Since the instrument has shrunk to the size of a small disc or ring, it may become desirable to provide a removeable handle. One possibility is illustrated in FIGURE 9. Here I provide a tube 130 of metal or plastic or similar material. One end has an internal ridge 131 that can fit into the circumferential groove 129 in the ring. The end of the tube 130 has a plurality of longitudinal cuts or slots 132 that form a plurality of leaf springs that permit slipping the end of the tube 130 over the disc 125 so that the ridge 131 will securely lock into the groove 129, thus fastening the handle to the disc, and also sealing the tubing (not shown) to the disc.

Figure 10:
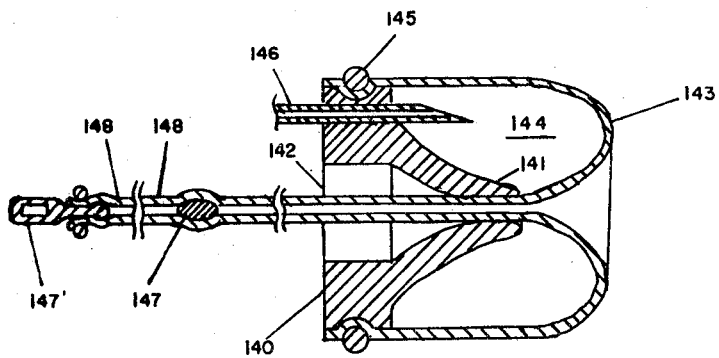
FIGURE 10 illustrates an embodiment in which the everting tubing carries into the cavity capsules of material or instruments.

In FIGURE 10, I show another embodiment in which there is inserted into the length of tubing 148 in collapsed form outside of the ring, a capsule 147 or volume of fluid or jell which is to be introduced into the cavity into which the tubing is everted. One method of operation, if the capsule contains radioactive material, for example, is to place it at such a point in the length of tubing so that when the tubing is everted into the cavity, the capsule can remain behind the farthermost portion of the tubing (that is, in a portion of the tubing that has not yet been everted). On the other hand, if the capsule contains a treating material, or if a volume of liquid or jell is placed in the tubing, it must be so positioned that when the portion of the tubing in which it is placed reaches the everting point, that point on the tubing must be at the desired position inside the cavity. Also, as in FIGURE 2 of my patent U.S. #3,168,092, the capsule can be sealed and fastened to a closed end of the tube. This is illustrated schematically as 147' fastened to the end of tubing 148. Or, as here illustrated, the capsule, container, or other material may be positioned within the collapsed tubing.

There are many ways in which the capsule can be placed inside the tubing, such as by a long probe inserted from either end of the tubing before the first end of the tubing is introduced through the seal opening in the disc. Similarly, liquid, jell, or powder can be introduced by means of a long needle.

I have pointed out in connection with the embodiment of FIGURE 4 how the tapering tubular extension 40 can be inserted into a small opening, and thus can serve to insert and direct the tubing into the cavity.

Figure 11:
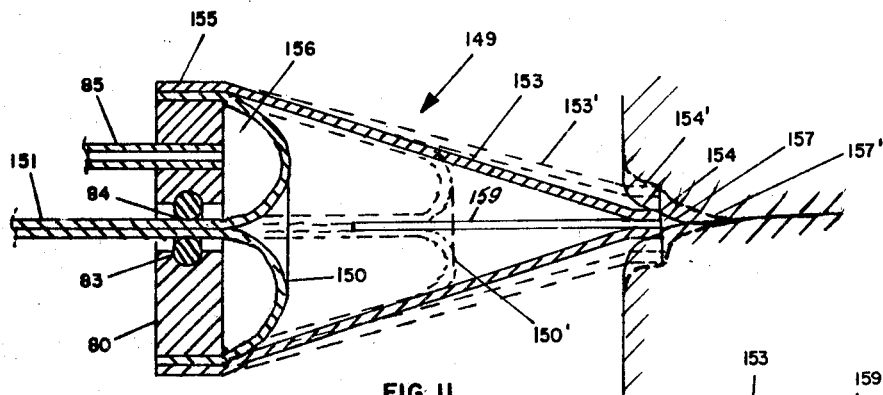
FIGURES 11 and 12 illustrate two views of an attachment to this instrument for use with very small cavities.
Figure 12:
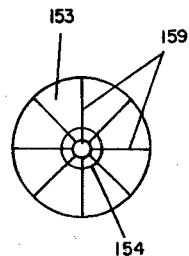

In FIGURES 11 and 12, I show an attachment of this device which can serve the same purpose for any embodiment. For example, I show in FIGURE 11 the embodiment of FIGURE 3 which consists essentially of the disc 80 with central seal opening 84 and fluid tube 85. The tubing 150 is inserted through the opening 84, turned back on itself and slipped over the circumference of the disc. It is locked in position by means of the conical fitting 149. This fitting, or nosepiece or adapter comprises a thin-walled tubular conical portion 153, a tubular extension 155 at the large end, adapted to be slipped over the edge of the disc, locking the tubing and forming a seal. If desired, this tubular portion 155 can extend farther to the left (not shown) so that it may be used as a handle for the device. Or another tube, as in FIGURE 9, can be placed over the extension 155. At the small end of the conical portion 153 is a short tubular extension 154 of small diameter, adapted to be inserted into the mouth of a small diameter extensible body conduit or cavity. The conical and small end portions 153, 154, are made expandable by being cut with a plurality of longitudinal cuts or slots 159 (FIGURE 12) adapted to make a plurality of flexible fingers, that can be spread outward when subjected to internal pressure. It is possible also to make the conical fitting of elastomeric material that can stretch and expand under the internal fluid pressure.

Illustrated in FIGURE 11 is the case where the tubing 150 is advanced only a short distance beyond the disc 80, and is still in the large diameter part of the conical portion 153. Also, the small tubular extension 154 is in its minimum diameter condition and is, for example, inserted into the mouth 157 of the small diameter cavity.

Now, as more fluid is forced into tube 85, the tubing 150 is everted to position, say 150'. At this point it is expanding outwardly against the inside of the conical leaves or fingers 153 which are forced outward to position 153'. The outward movement opens the small end 154 to position 154', thus pushing or enlarging the mouth 157 to position 157'. This leaves an opening inside of 154 to lead the everting tubing into the inside of the cavity.

While I have shown this conical nosepiece as an attachment for the disc or ring type of apparatus of this invention, it is a separate useful assembly that can also be used in conjunction with the apparatus of FIGURE 1 of my patent U.S. #3,168,092 or any similar apparatus.

Figure 13:
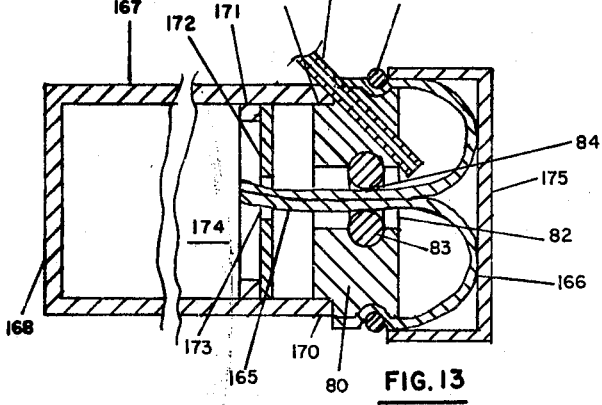
FIGURE 13 illustrates an embodiment in which a container of tubing to be everted is attached to the everting instrument.

In the use of long tubings which are to be everted into a conduit or cavity, it is desirable to provide some means of handling this length of tubing and keeping it clean, or even sterile, if necessary, etc. In FIGURE 13, I show a means for doing this. Again I show the ring or disc 80 as in FIGURE 3, as an example of the type of everting device that might be used. This differs slightly in having a shoulder 169 on the first face (opposite to the face at which eversion takes place). This shoulder serves to support a cylindrical container 167 that has a closed back end 168 and an open front end with a lip 170 adapted to fit over the shoulder 169. This container may have an internal ridge 171 near the open end that can support a closing plate 172. This plate 172 preferably has a central opening 173 through which the tubing 165 feeds from the interior 174 of the container 167. If desired, the container, when detached from the everting device may have a dust cap or cover (not shown) placed over its open end. This container 167 serves as storage for the unused length of tubing, and also as a handle for the everting device.

The tubing 165 can be coiled up or otherwise placed in the container and the first end threaded through the opening 173. The end is then threaded through the opening 84 in the disc 80, turned back and sealed at 81. The container 167 is pressed over the shoulder 169. If desired, a dust cap or cover 175 may be placed over the front end of the instrument. The entire instrument can then be sterilized and packaged and it is ready for use.

Depending on the use to which the tubing is to be put, a length of tubing can be everted into a cavity. Then the container 67 can be removed and the tubing cut and sealed. An instrument may be inserted into the end of the tubing before it is sealed or it may be tied to the end after the tubing is sealed. Preferably, a retrieval member such as a cord, flexible small diameter rod or tube, etc., is joined to the end of the tubing, such member adapted to be sealed through the opening 84.

While I have illustrated my invention with a number of specific embodiments, it will be clear that these are by way of example only, and based on the teachings of this invention, others skilled in the art will be able to devise other embodiments, all of which are to be considered as part of this invention. For example, the conical nosepiece of FIGURES 11 and 12 can be manufactured by attaching a plurality of tapered spring strips or fingers 153 to the base ring or tube 155. Also, all of the types and varieties of flexible tubings or probes illustrated in my patent U.S. No. 3,168,092 and in my copending applications can, of course, be used in connection with the apparatus of this invention.

I claim:
1. Apparatus for everting a thinwalled eversible tubing comprising,
   (a) a length of collapsed thinwalled eversible tubing,
   (b) a disc with a tubular extension substantially perpendicular to the front face of said disc and extending along the axis of said disc, a continuous axial passage through said extension and said disc adapted to pass said collapsed tubing therethrough, said tubular extension of lesser diameter than said disc and adapted to enter a small body orifice,
   (c) said collapsed tubing inserted from the back wall of said dics through said passage and extending beyond the end of said extension, resilient means operatively associated with said passage to slidably seal said tubing to said extension,
   (d) said tubing extending from the front of said extension folded back on itself to form a cuff, said cuff sealed to said disc so as to form a closed annular volume inside said cuff, and
   (e) means to inject fluid into said annular volume, whereby when fluid is injected into said annular volume,
   Whereby when fluid is injected into said annular volume, said volume will expand longitudinally causing said collapsed tubing to be drawn through said passage and to be everted.

2. Apparatus as in claim 1 in which said means to inject fluid into said annular volume comprises removable tubular needle means adapted to penetrate the wall of said disc.

3. Apparatus as in claim 1 in which said extension is made of resilient material adapted to seal said collapsed tubing passing through said passage.

4. Apparatus as in claim 1 including cylindrical container means adapted to hold a predetermined length of tubing in collapsed form, said container adapted to be placed in operating relation to the back surface of said disc, whereby said tubing is drawn from said container into and through said passage in said disc and extension.

5. Apparatus as in claim 1 including removable cylindrical handle means and fastening means adapted to fasten said handle means to said disc.

6. Apparatus as in claim 1 including a quantity of material inserted within said collapsed tubing at a predetermined distance from said disc, whereby when said tubing is everted, said material will be drawn through said passage and exposed when the portion of said tubing in which said material is placed is everted.

7. Apparatus as in claim 1 including instrument means attached to said collapsed tubing at a predetermined distance from said disc.

8. Apparatus as in claim 7 in which said instrument means comprises an elongated small diameter cylindrical means.

9. Apparatus as in claim 8 in which said instrument means comprises a small bore thickwalled tube adapted to pass fluid therethrough.

10. Apparatus as in claim 9 including means to control the flow of fluid through said tube.

11. Apparatus as in claim 10 in which said control means comprises shut off valve means.

12. Apparatus as in claim 10 in which said control means comprises check valve means adapted to pass fluid through said tube in one direction only.

13. Apparatus as in claim 1 in which said extension includes resilient means inside said passage to seal against said collapsed tubing passing through said passage.

14. Apparatus as in claim 1 in which said tubular extension tapers to a smaller diameter away from the front surface of said disc.

15. The apparatus of claim 1 including thinwalled funnel-shaped nozzle means adapted to be placed over said extension and to surround said cuff, said nozzle means tapering to a smaller diameter adapted to be inserted into a small body orifice, at least the small end portion of said nozzle means being made of flexible material and adapted to be expanded to a larger diameter by outward pressure against the inner surface of said nozzle due to the fluid pressure inside the everting tubing.

16. Apparatus for everting a flexible thinwalled tubing, comprising,
   (a) a length of collapsed thinwalled eversible tubing,
   (b) one end of said tubing turned back on itself to form a cuff, said cuff and said collapsed tubing forming an annular volume,
   (c) said cuff in sliding sealing contact with said collapsed tubing to close off said annular volume, and
   (d) means to inject fluid into said closed off annular volume, whereby when said fluid is injected into said closed off annular volume, said volume will be expanded longitudinally causing said collapsed tubing to be drawn through said seal and to be everted.

17. Apparatus as in claim 16 in which said means to inject fluid into said volume comprises needle means inserted into the annular space between laid cuff and said collapsed tubing.

18. Apparatus as in claim 16 in which said means to slidably seal comprises means to press said cuff into sliding sealing contact with said collapsed tubing.

19. Apparatus as in claim 18 in which said means to press comprises a ring of resilient material adapted to press said cuff into sliding sealing contact with said collapsed tubing.

20. Apparatus as in claim 16 in which said cuff portion is turned back on said tubing at least one time so that there are at least two layers of turned back tubing surrounding said collapsed tubing.

21. Apparatus as in claim 20 including a ring of resilient material inside said volume adapted to press at least one layer of said turned back portion into sealing contact with said collapsed tubing.

22. Apparatus as in claim 16 including at least one volume of material placed within said collapsed tubing at a predetermined distance from said sliding seal, whereby when said tubing is everted, said material will be drawn through said seal and exposed when the portion of said tubing in which said material is placed is everted.

23. Apparatus as in claim 16 including instrument means attached to said collapsed tubing at a predetermined distance from said seal.

24. Apparatus as in claim 23 in which said instrument means comprises a small bore thickwalled tube adapted to pass fluid therethrough, and including means to control the flow of fluid through said tube.

25. In an apparatus for everting a thinwalled flexible tubing into an elongated constricted conduit, the mouth of said conduit is extensible from a minimum diameter $d$, to a larger diameter, said apparatus including at its front end a portion of said flexible tubing folded back on itself to form a cuff, said cuff sealed circumferentially to the front portion of said apparatus to form an annular volume sealed by the remaining portion of said apparatus, into which fluid is introduced to extend said volume by forcing said tubing forward and causing it to be everted, the improvement comprising,
   (a) thinwalled funnel-shaped nozzle means adapted to be placed in operating relation to the front end of said apparatus,
   (b) said nozzle means having a large diameter end of diameter larger than said cuff,
   (c) said nozzle means tapering to a small diameter end of diameter less than $d$, (d) at least the small end portion of said nozzle means being made of flexible material and adapted to be expanded to a larger diameter by outward pressure against the inner surface of said nozzle due to the fluid pressure inside the everting tubing
whereby when said small end portion of said nozzle is inserted into the mouth of said conduit, said apparatus is placed adjacent said nozzle such that said cuff portion is inside said nozzle, and fluid is introduced into said annular volume, said volume will be expanded longitudinally causing said tubing to be everted into said nozzle, the pressure of said fluid in said everting tubing causing said tubing to press outwardly against the inner surface of said nozzle, causing the small end portion to expand, enlarging the mouth of said conduit, and permitting said everting tubing to pass through said nozzle into said conduit.

26. The apparatus as in claim 25 in which at least the small end portion of said nozzle is made of elastomeric material.

27. The apparatus as in claim 25 in which the small end portion of said nozzle is formed from a plurality of finger-like spring leaves attached to the large end of said nozzle.

28. The apparatus as in claim 25 including a tubular extension at the large end of said nozzle adapted to be placed over and fastened to the front portion of said apparatus in a position such that said extension surrounds and encloses said cuff.

References Cited

UNITED STATES PATENTS

| 668,879 | 2/1901 | Miller | 128—345 X |
| 1,595,180 | 8/1926 | Fisher | 128—240 |
| 2,794,758 | 6/1957 | Harper et al. | 156—286 |
| 3,168,092 | 2/1965 | Silverman | 128—262 X |
| 3,178,732 | 4/1965 | Stibitz | 128—262 X |
| 3,230,129 | 1/1966 | Kelly | 156—287 |

FOREIGN PATENTS 106,568  2/1889  Germany.

DALTON L. TRULUCK, Primary Examiner

U.S. Cl. X.R.

128—262, 343; 156—294